(12) United States Patent
Feller

(10) Patent No.: US 7,416,192 B1
(45) Date of Patent: Aug. 26, 2008

(54) SLED THAT DISPENSES COLORED FLUID

(76) Inventor: Larry J. Feller, 3009 Paladin Ter., Olney, MD (US) 20832

( * ) Notice: Subject to any disclaimer, the term of this patent is extended or adjusted under 35 U.S.C. 154(b) by 620 days.

(21) Appl. No.: 10/994,584

(22) Filed: Nov. 22, 2004

(51) Int. Cl.
*B62B 17/00* (2006.01)

(52) U.S. Cl. .................. 280/19; 280/21.1; 280/18.1

(58) Field of Classification Search ............ 280/18, 280/19.1, 20, 24, 28.18, 652, 14.28, 14.1, 280/14.22, 14.21, 14.23, 15, 16, 19, 21.1, 280/18.1, 845; 22/185.1, 173, 182, 402.21, 22/402.23; 118/305; 222/610, 182, 402.13
See application file for complete search history.

(56) References Cited

U.S. PATENT DOCUMENTS

| | | | | |
|---|---|---|---|---|
| 3,082,731 A * | 3/1963 | Cousteau et al. | ............... | 280/19 |
| 3,439,929 A * | 4/1969 | Murray | ..................... | 280/18 |
| 3,933,283 A * | 1/1976 | Hoagland | ............... | 222/402.13 |
| 4,328,911 A * | 5/1982 | Knickerbocker | ............ | 222/182 |
| 4,426,026 A * | 1/1984 | Knickerbocker | ....... | 222/402.13 |
| 4,599,968 A * | 7/1986 | Ryder et al. | ................. | 118/305 |
| 4,863,075 A * | 9/1989 | Romer | ................... | 222/610 |
| 5,007,368 A * | 4/1991 | Bush | ...................... | 116/211 |
| 5,165,966 A * | 11/1992 | Adams | ......................... | 427/256 |
| 5,306,026 A * | 4/1994 | Jesse | ........................... | 280/18 |
| 5,309,652 A * | 5/1994 | Campbell | ..................... | 36/124 |
| 5,735,940 A * | 4/1998 | Coller | ....................... | 106/31.01 |
| 6,310,551 B1 * | 10/2001 | Croft | ............................ | 280/18 |
| 6,491,187 B2 * | 12/2002 | Walters | ...................... | 222/185.1 |
| 6,546,638 B2 * | 4/2003 | Beyer | .......................... | 33/348 |
| 2005/0017026 A1 * | 1/2005 | Yerby et al. | ............ | 222/402.13 |

FOREIGN PATENT DOCUMENTS

DE 4000901 A * 7/1990

* cited by examiner

*Primary Examiner*—Hau V Phan
(74) *Attorney, Agent, or Firm*—Richard L Huff

(57) ABSTRACT

A sled having an aerosol container containing a coloring fluid so as to allow the user to leave behind one or two colored trails showing where the sled has gone. The aerosol container is in a jacket attached to a movable mounting plate. The tilt actuator of the container is activated by a trigger wire which is attached to a trigger on the sled handle.

6 Claims, 4 Drawing Sheets

SLED THAT DISPENSES COLORED FLUID

CROSS-REFERENCE TO RELATED APPLICATIONS (Not applicable)

STATEMENT REGARDING FEDERALLY SPONSORED RESEARCH OR DEVELOPMENT (Not applicable)

REFERENCE TO SEQUENTIAL LISTING, A TABLE, OR A COMPUTER PROGRAM LISTING APPENDIX SUBMITTED ON A COMPACT DISC (Not applicable)

BACKGROUND OF THE INVENTION

1) Field of the Invention

This invention lies in the field of snow sleds. More particularly, this invention concerns sleds which have the capability to dispense colored fluids so as to color the snow and leave a decorative trail showing where the sled has been.

2) Description of the Related Art

The prior art is aware of sleds having two runners, a flat platform on the runners, and a steering handle. Such sleds have for years been a source of enjoyment to children who use them for sliding down snow-covered hills or carrying loads or other children over the snow. There has been lacking any additional feature to add to this enjoyment. It is the purpose of this invention to add a feature to such sleds which will enable sleds to leave behind colored trails showing where they have been.

BRIEF SUMMARY OF THE INVENTION

The starting point for the present invention is the common sled. Preferably, the sled is the conventional one having two runners, a platform sitting on the runners, and a steering handle attached to the platform and the runners. There is a container for a coloring fluid attached to the side of the sled near the rear end in such a way that it is easily removable and may be turned so that the nozzle of the container is pointed downwardly. A control mechanism is positioned on the steering handle. This mechanism is connected to the container by wire or the like to enable the user to use the device whenever desired.

DETAILED DESCRIPTION OF THE INVENTION

Figure 1:
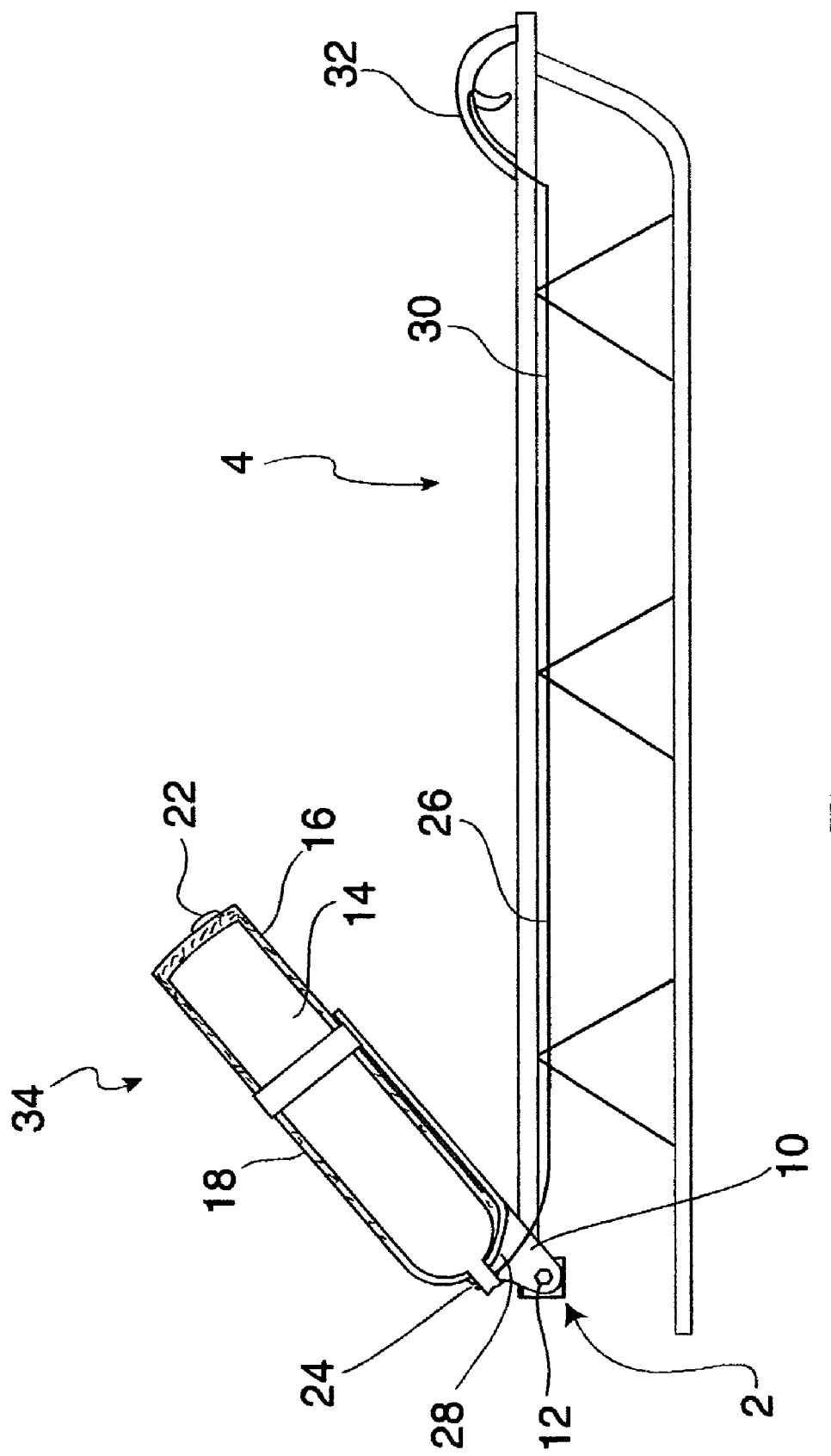
FIG. 1 is an elevational side view showing a sled with a device of the invention mounted on a rear corner.
Figure 2:
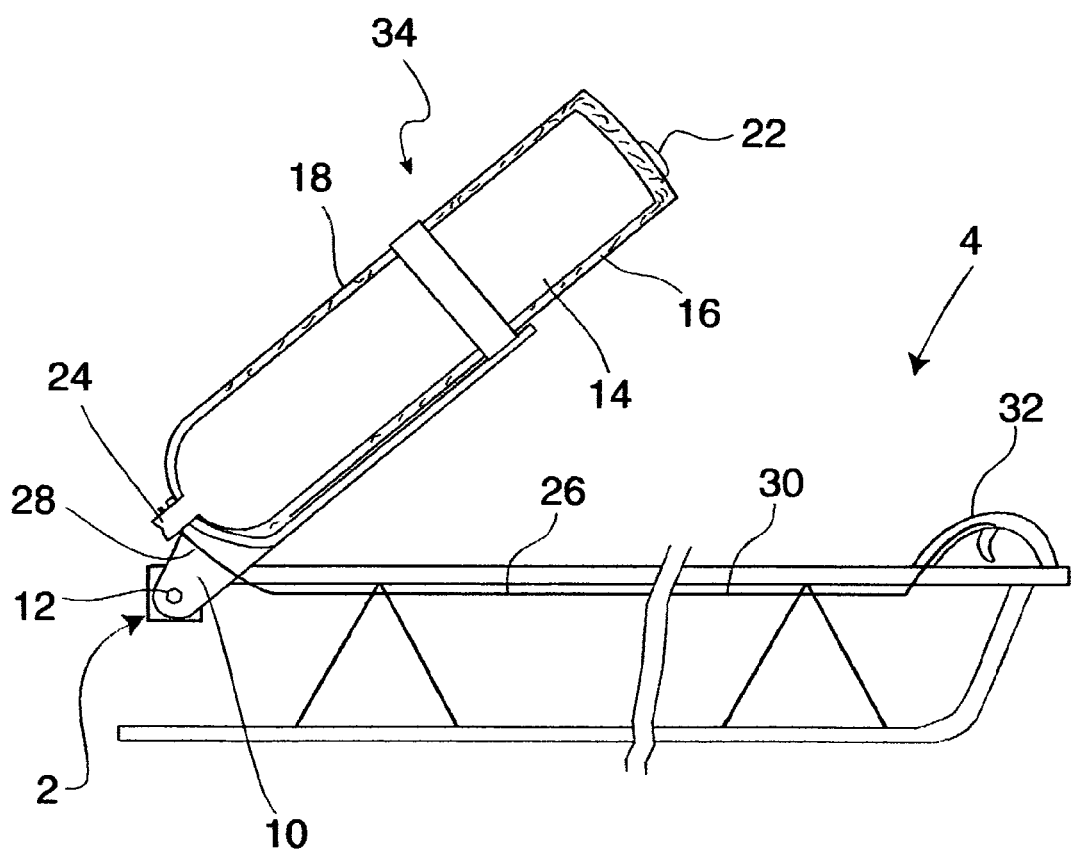
FIG. 2 is a view similar to FIG. 1, but enlarged to show detail.
Figure 4:
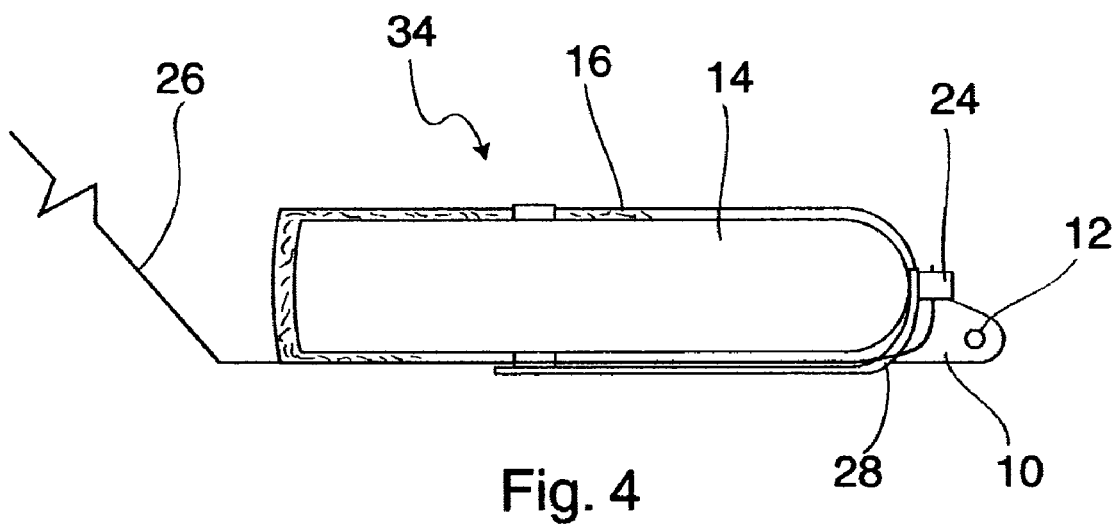
FIG. 4 is a side elevational view showing the container in place on a mounting plate.
Figure 3:
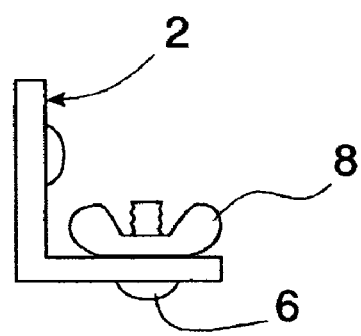
FIG. 3 is a side cross-sectional view showing the container attached to the mounting plate with the controlling wire in place.
Figure 5:
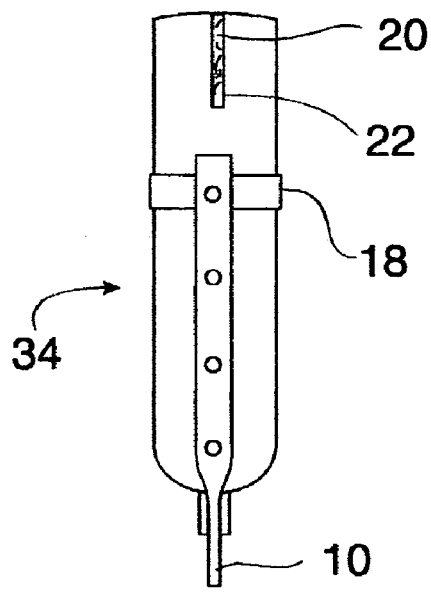
FIG. 5 is a bottom elevational view of the container and mounting plate.
Figure 6:
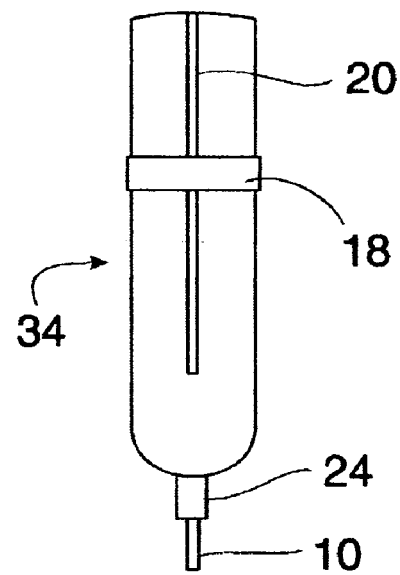
FIG. 6 is a top elevational view of the container and mounting plate.
Figure 7:
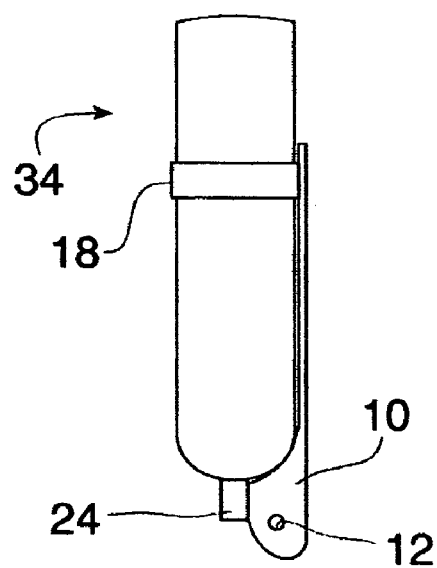
FIG. 7 is a side elevational view of the container and mounting plate.

The invention will now be described with reference to the above drawings wherein like identifying numerals refer to the same feature the drawings.

An attachment bracket 2 is attached to each side of a sled 4 using common attachment means such a bolt 6 and a nut 8.

A mounting plate 10 having an attachment hole 12 is removably and movably attached to the attachment bracket 2 by any convenient attachment. The bolt and wing nut are preferred as these are inexpensive and easy to use. The mounting plate 10 can be rotated about the attachment hole 12 so as to place the container 14 in a vertical position for dispensing colored fluid or in a horizontal position for storage.

The mounting plate 10 holds an insulating jacket 16. Preferred methods of attachment of the insulating jacket 16 to the mounting plate 10 are rivets and straps 18. The purpose of the insulating jacket 16 is to hold the fluid container 14. The insulating jacket 16 contains an opening 20 which may easily be opened and securely closed with conventional closure devices 22 such as zippers.

A tilt-type aerosol container 14 is contained by the insulating jacket 16. The container 14 carries a biodegradable marking fluid which is water-soluble and may be of a variety of colors. Bright colors are preferred. The fluid is harmless to plant and animal life and is water-soluble to enable easy removal in the event it comes in contact with clothes or skin. Water-soluble paint is a preferred fluid. The fluid may exit the container 14 as an aerosol spray or as a liquid stream. The width of the colored trail is a function of the nozzle construction and as such, is well known in the art. The actuator 24 is a tilt type actuator which is activated by causing the actuator 24 to move from a position pointing straight away from the container 14.

A trigger wire 26 has a first end 28 attached to the actuator 24 and a second end 30 held by the trigger 32. The trigger 32 is hand-operated and is similar in construction and mode of operation to a hand-operated bicycle brake wherein the user closes his or her hand to cause the trigger wire 26 to pull the actuator 24 out of alignment with the container 14 and cause the dispensing of the coloring fluid.

When the trigger 32 brings the actuator 24 out of alignment, the pressurized gas in the container forces the coloring fluid out of the container and onto the snow. While the invention has been described with reference to a single container, it is preferable to have a pair of containers so that a colorful two-lined trail is left on each side of the sled 4. When several sleds 4 have devices 34 of the present invention having different colors, the users can easily determine which sled 4 has gone the greatest distance down a hill.

Although the invention has been described and illustrated in detail, it is to be clearly understood that the same is by way of illustration and example, and is not to be taken by way of limitation. The spirit and scope of the present invention are to be limited only by the terms of the appended claims.

The invention claimed is:

1. A sled having a steering handle and having an aerosol container attached thereto, which aerosol container contains a coloring fluid wherein the aerosol container may be operated by a trigger mounted to the steering handle.

2. The sled of claim 1, wherein the container is held within a jacket.

3. The sled of claim 1, wherein the container is movable and removable.

4. The sled of claim 1, wherein the container has a tilt actuator.

5. The sled of claim 4, wherein the hand operated trigger is operatively connected to the tilt actor.

6. The sled of claim 5, wherein the hand-operated trigger is connected to the tilt actuator by a wire.

* * * * *